United States Patent
Can et al.

(10) Patent No.: US 9,348,047 B2
(45) Date of Patent: May 24, 2016

(54) MODELING OF PARALLEL SEISMIC TEXTURES

(71) Applicant: General Electric Company, Schenectady, NY (US)

(72) Inventors: Ali Can, Troy, NY (US); Erhan Bas, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 644 days.

(21) Appl. No.: 13/722,755

(22) Filed: Dec. 20, 2012

(65) Prior Publication Data

US 2014/0177390 A1    Jun. 26, 2014

(51) Int. Cl.
*G01V 1/28* (2006.01)
*G01V 1/30* (2006.01)
*G01V 1/34* (2006.01)

(52) U.S. Cl.
CPC ............. *G01V 1/302* (2013.01); *G01V 1/301* (2013.01); *G01V 1/28* (2013.01); *G01V 1/30* (2013.01); *G01V 1/345* (2013.01); *G01V 2210/64* (2013.01)

(58) Field of Classification Search
CPC ........... G01V 1/30; G01V 1/345; G01V 1/28; G01V 1/282; G01V 1/34
USPC ........................ 367/73; 702/14, 16
See application file for complete search history.

(56) References Cited

U.S. PATENT DOCUMENTS

| | | |
|---|---|---|
| 4,821,164 A * | 4/1989 | Swanson ............. 702/5 |
| 4,916,615 A | 4/1990 | Chittineni |
| 4,992,995 A | 2/1991 | Favret |
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Oayia et al. |
| 6,526,353 B2 | 2/2003 | Wallet et al. |

(Continued)

FOREIGN PATENT DOCUMENTS

| | | |
|---|---|---|
| JP | 2001084462 | 3/2001 |
| JP | 2003293257 | 10/2003 |

(Continued)

*Primary Examiner* — Ian J Lobo

(74) *Attorney, Agent, or Firm* — Fletcher Yoder, P.C.

(57) ABSTRACT

An approach for seismic data analysis is provided. In accordance with embodiments of this approach, parallel regions within a volume of seismic data are modeled. Residual regions within the volumetric data set are identified, where the residual regions comprise those regions not modeled as parallel regions. The residual regions or a graphic derived from the residual regions are displayed for review.

29 Claims, 13 Drawing Sheets

(9 of 13 Drawing Sheet(s) Filed in Color)

(56) References Cited

U.S. PATENT DOCUMENTS

| | | |
|---|---|---|
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurent et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,385,603 B2 | 2/2013 | Beucher et al. |
| 8,447,525 B2 | 5/2013 | Pepper et al. |
| 8,515,678 B2 | 8/2013 | Pepper et al. |
| 2001/0032051 A1* | 10/2001 | Grismore et al. ............... 702/16 |
| 2003/0009289 A1* | 1/2003 | West et al. ...................... 702/14 |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop et al. |
| 2006/0184488 A1 | 8/2006 | Wentland |
| 2008/0123469 A1 | 5/2008 | Wibaux et al. |
| 2008/0185478 A1 | 8/2008 | Dannenberg |
| 2008/0270033 A1 | 10/2008 | Wiley et al. |
| 2009/0204332 A1* | 8/2009 | Lomask et al. ............... 702/16 |
| 2010/0149917 A1* | 6/2010 | Imhof et al. .................... 367/53 |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2011/0002194 A1* | 1/2011 | Imhof et al. .................... 367/53 |
| 2011/0118985 A1 | 5/2011 | Aarre |
| 2011/0307178 A1 | 12/2011 | Hoekstra |
| 2012/0072116 A1 | 3/2012 | Dorn et al. |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0261135 A1* | 10/2012 | Nowak et al. ................ 166/369 |
| 2012/0322037 A1 | 12/2012 | Raglin |
| 2013/0006591 A1 | 1/2013 | Pyrez et al. |
| 2013/0138350 A1 | 5/2013 | Thachaparambil et al. |
| 2013/0144571 A1 | 6/2013 | Pepper et al. |
| 2013/0158877 A1 | 6/2013 | Bakke et al. |

FOREIGN PATENT DOCUMENTS

| | | |
|---|---|---|
| JP | 2005244200 | 9/2005 |
| JP | 2012220500 | 11/2012 |
| WO | WO 9964896 | 12/1999 |

* cited by examiner

MODELING OF PARALLEL SEISMIC TEXTURES

BACKGROUND

The subject matter disclosed herein relates to the analysis of seismic data, such as to identify features of interest.

Seismic data is collected and used for evaluating underground structures and features that might otherwise not be discernible. Such seismic data may be useful for in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is in the interpretation and analysis of the large three-dimensional data sets that can be generated in a seismic survey project. In particular, analysis of such data sets may be tedious and time-consuming, potentially requiring months of manual work to analyze.

BRIEF DESCRIPTION

In one embodiment a method is provided for analyzing seismic data. The method comprises the act of accessing a volumetric seismic data set for analysis. A plurality of regions are modeled using basis volumes derived from parallel regions within the volumetric seismic data set. One or more residual regions within the volumetric data set are identified. The one or more residual regions comprise those regions not suitably modeled with the basis volumes based on a threshold criterion. The one or more residual regions or a graphic derived from the one or more residual regions are displayed for review.

In another embodiment, a non-transitory, computer-readable medium is provided that is configured to store one or more routines executable by a processing system. The routines, when executed, cause acts to be performed comprising: accessing a volumetric seismic data set for analysis; modeling a plurality of parallel regions within the volumetric seismic data set; identifying one or more residual regions within the volumetric data set, wherein the one or more residual regions comprise those regions not modeled as parallel regions based on a threshold criterion; and displaying the one or more residual regions or a graphic derived from the one or more residual regions for review.

In a further embodiment, a seismic data analysis system is provided. The seismic data analysis system comprises a memory storing one or more routines and a processing component configured to execute the one or more routines stored in the memory. The one or more routines, when executed by the processing component, cause acts to be performed comprising: accessing a volumetric seismic data set for analysis; modeling a plurality of parallel regions within the volumetric seismic data set; identifying one or more residual regions within the volumetric data set, wherein the one or more residual regions comprise those regions not suitably modeled as parallel regions based on a threshold criterion; and displaying the one or more residual regions or a graphic derived from the one or more residual regions for review.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood when the following detailed description is read with reference to the accompanying drawings in which like characters represent like parts throughout the drawings, wherein.

DETAILED DESCRIPTION

Figure 1:
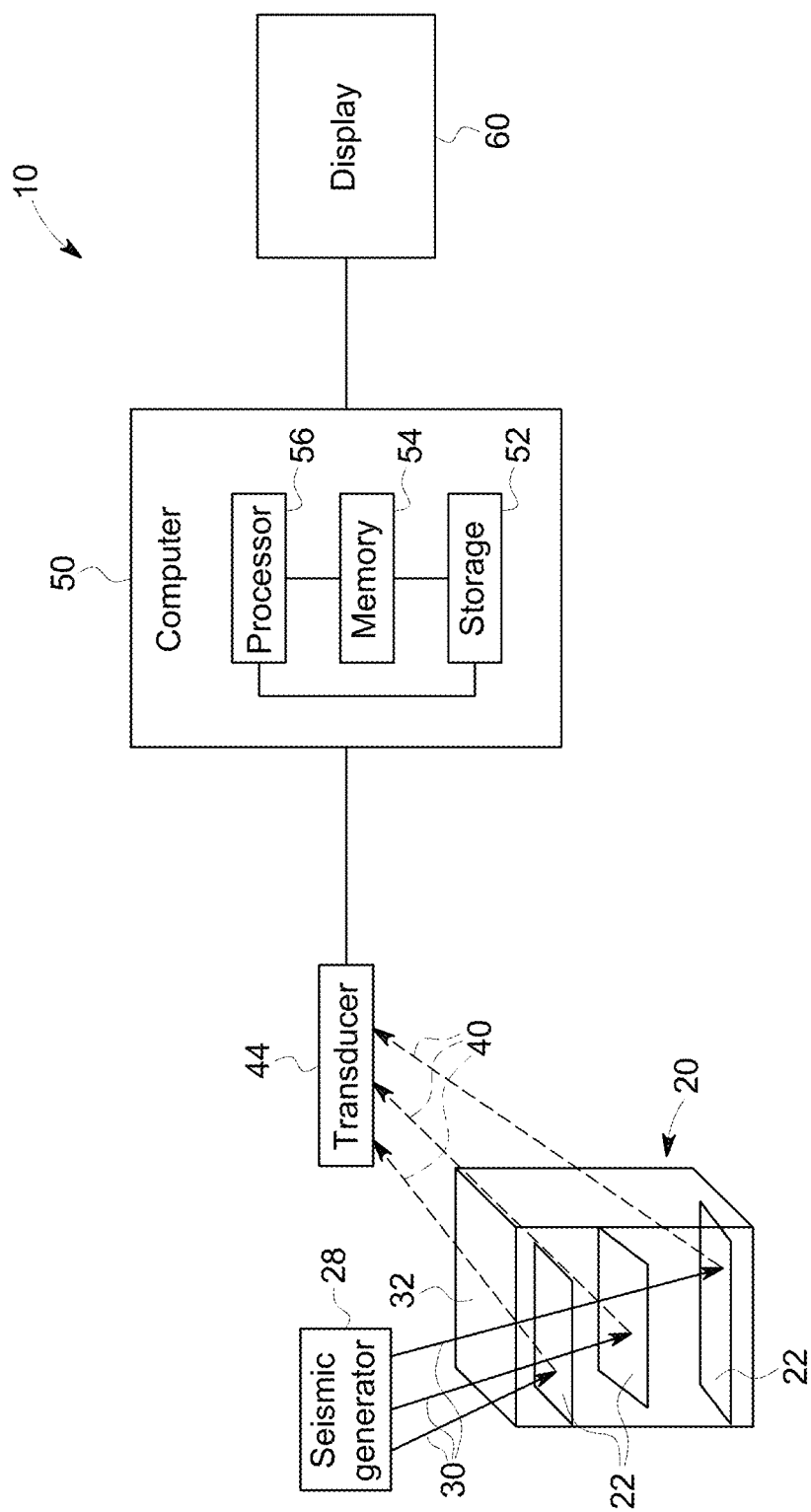
FIG. 1 depicts an example of a seismic data acquisition and analysis system, in accordance with aspect of the present disclosure.

Seismic data may be used to analyze and detect subsurface features. For example, identification of geobodies (e.g., channels, pinchouts, progrades, gas chimneys, and so forth) from a three-dimensional (3D) seismic survey may be performed as part of prospecting for hydrocarbons (e.g., oil, natural gas, and so forth). As generally used herein, a geobody is a feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time consuming and imprecise task of interpreting the 3D volumes generated from the acquired seismic data. For example, a single seismic volume may require months of manual work to analyze. As discussed herein, automated methods may make such time consuming work more feasible for a reviewer to interpret. However, automated interpretation of a 3D volume generated from seismic images may be difficult to achieve in practice and involves accurate modeling of geobodies within the data. Such geobodies may be characterized by intensity as well as other attributes that have been defined and used to characterize the various geobodies. Once geobodies are characterized in this manner, segmentation tools can be utilized to partition the seismic data into meaningful subsets and to highlight regions for prospecting and analysis. The broad range of seismic attributes is an indicator of the various kinds of geobodies embedded to the strata. However, in a hydrocarbon prospecting context, many such attributes are redundant and only a few such attributes may be needed to uncover the underlying geology.

With this in mind, and as discussed herein, the present approach models simple structures with minimal descriptors to prevent redundancies and increase efficiency of automated analyses. For example, certain geobodies, such as channels, may be characterized as complex stratigraphic reservoirs that may be difficult to interpret and identify. Conversely, compared to such wavy and chaotic structures, simple (i.e., non-complex) structures such as parallel facies may be easier to model. Thus, as discussed herein, an approach is utilized in which noncomplex geobodies are initially modeled and reconstructed. Subsequently, other complex structures are inspected or identified in the residual of the seismic reconstruction.

By way of example, in one implementation simple parallel textures (SPT) are accurately modeled in 3D seismic data. In one embodiment the simple parallel textures are modeled as amplitude modulated cosine functions and frequency variations in the modulation are learned and modeled with non-negative matrix factorization (or using other suitable modeling approaches, such as template based approaches). Fourier based descriptors may then be utilized to accurately estimate the 3D orientation of simple parallel textures, to model simple parallel texture regions, and to highlight anomalies in the 3D volume. Such modeling of simple (i.e., non-complex) regions, such as simple parallel textures, may be useful for geobody detection due to the majority of geobodies being associated with regions where parallel facies have discontinuities or variations (i.e., anomalies). Morphological reconstruction of such detected anomalies or outlier regions may allow geobodies of interest, such as channels, to be identified. Thus, highlighting or emphasizing parallel textures also results in such complementary (i.e., complex) regions being identifiable.

In addition, modeling of simple regions may be useful for geobody tracking of objects in seismic images, which may be complicated by factors attributable to the imaging technique (e.g., surface reflections, signal to noise ratio, and so forth) and/or due to the complexity of object interactions (e.g., complex trapping mechanisms). Thus tracking (as well as identification) of such objects in complex topologies may be improved or simplified by accurate modeling of noncomplex regions, as discussed herein. Similarly, accurate modeling of noncomplex regions, such as simple parallel textures, may be helpful for segmenting geologic layers which may in turn be used in clustering sequence stratigraphy applications, where strata may be clustered into major unconformity bounds Further, components of accurate modeling of noncomplex regions such as simple parallel textures may be useful for various analysis applications such as flattening, denoising, and/or upsampling or visualization. For example, flattening seismic images transforms the seismic images into layers as they are deposited in geological time. It may be easier to interpret certain types of geobodies, such as channels, in such transformed, i.e., normalized, images compared to raw images. In addition, extraction of horizons is reduced to selection of corresponding slices in 3D. Flattening processes may utilize local orientation and affinity estimation (as discussed herein with respect to modeling simple parallel textures), which can also be used for denoising of seismic images. Given the noisy characteristic of such images, denoising may be helpful for data visualization as well as interpretation.

With the foregoing discussion in mind, the present approach may be utilized in conjunction with a 3D seismic data set generated using any suitable seismic surveying system. Turning to FIG. 1, a high-level overview of one such seismic surveying system 10 is provided by way of example. In the depicted example, a subsurface volume 20 is probed by the seismic surveying system 10. The subsurface volume 20 may typically include various layers or strata 22 at different depths and orientations within the volume 20. These various strata 22 define respective boundaries and transitions within the volume which may act to reflect waves (e.g., seismic or acoustic waves) propagating through the subsurface volume 20. Likewise, other features or geobodies within the subsurface volume (e.g., channels, pinchouts, progrades, gas chimneys, and so forth) may also include surfaces, transitions, or boundaries that act to reflect acoustic or seismic waves.

In the depicted example, a seismic generator 28 of some form (such as one or more controlled detonations, an air gun or cannon, or another suitable source of seismic waves) is part of the seismic surveying system 10. The seismic generator 28 can typically be moved to different positions on the surface of the volume 20 and can be used to generate seismic waves 30 at different positions on the surface 32 that penetrate the subsurface volume 20 under investigation. The various boundaries or transitions within the subsurface 20 (either associated with the various layers or strata 22 or with more complex geobodies) cause the reflection 40 of some number of the seismic waves 30. One or more transducers 44 at the surface 32 may be used to detect the waves 40 reflected by the internal structures of the subsurface volume 20 and to generate responsive signals (i.e., electrical or data signals).

These signals, when reconstructed, represent the internal boundaries and features of the subsurface volume 20. For example, in the depicted embodiment, the signals are provided to one or more computers 50 or other suitable processor-based devices that may be used to process the signals and reconstruct a volume depicting the internal features of the subsurface volume 20. In one embodiment, the computer 50 may be a processor-based system having a non-volatile storage 52 (such as a magnetic or solid state hard drive or an optical media) suitable for storing the data or signals generated by the transducer 44 as well as one or more processor-executable routines or algorithms, as discussed herein, suitable for processing the generated data or signals in accordance with the present approaches. In addition, the computer 50 may include a volatile memory component 54 suitable for storing data and signals as well as processor-executable routines or algorithms prior to handling by the processor 56. The processor 56 may, in turn, generate new data (such as a volumetric representation of the subsurface volume 20 and/or a set of features of interest for further analysis) upon executing the stored algorithms in accordance with the present approaches. The data or reconstructions generated by the processor 56 may be stored in the memory 54 or the storage device 52 or may be displayed for review, such as on an attached display 60.

Figure 2:
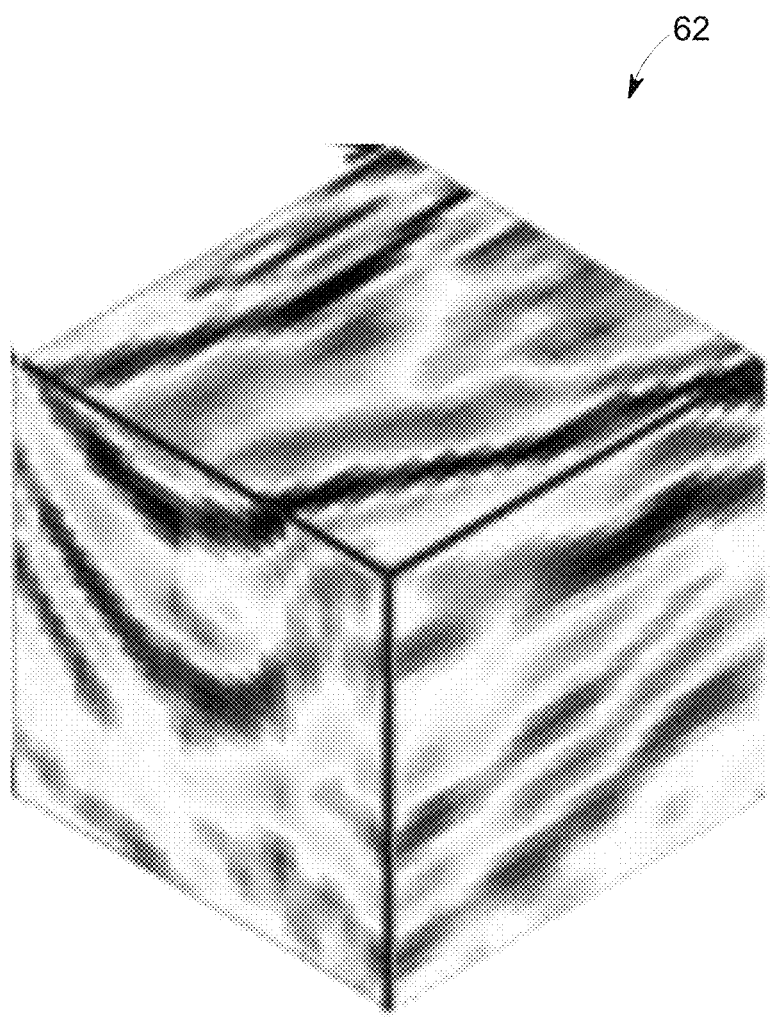
FIG. 2 depicts an example of a volume of seismic data for analysis, in accordance with aspect of the present disclosure.

Turning to FIG. 2, a representation of a reconstruction 62 of 3D seismic data of a portion of a subsurface volume 20 is depicted. As depicted in FIG. 2, such a reconstruction 62 may depict features of the subsurface volume 20, such as various strata, layers, and geobodies, which due to geological processes and time scales, may be at various orientations relative to one another. As will be appreciated, manual inspection of large amounts of such reconstructed data may be challenging and time-consuming.

With this in mind, a present implementation facilitates inspection of a reconstructed 3D volume 62 of seismic data. In particular, this implementation initially models parallel regions (i.e., simple parallel textures) within the data. Those regions that are not modeled as parallel regions (i.e., the residual or outlier regions) may then be further analyzed for correspondence to geobodies of interest. That is, the obtained model of simple parallel textures may be used to identify those regions corresponding to complex stratigraphic geobodies because such complex region would be outliers of the model fit. In one embodiment, these complex regions or outliers may be further processed to generate a skeletal representation of the underlying morphology of the geobodies of interest, such as channels.

Prior to discussing the proposed methodology in depth, an overview of aspects of the present approach is provided to facilitate subsequent detailed explanation. For example, accurate modeling of simple parallel textures as discussed herein may be based on reliable features that inherit the local topology. In accordance with certain implementations, it is assumed that parallel facies deposited in a region can be modeled as parallel surfaces having an intensity profile consistent with amplitude modulated cosine functions. This assumption is consisted with the premise that the geological strata have been deposited over time. One proposed implementation discussed herein is based on Fourier domain analysis of local intensity profiles in a region, which provides sufficient discrimination to identify the simple parallel textures.

Figure 3:
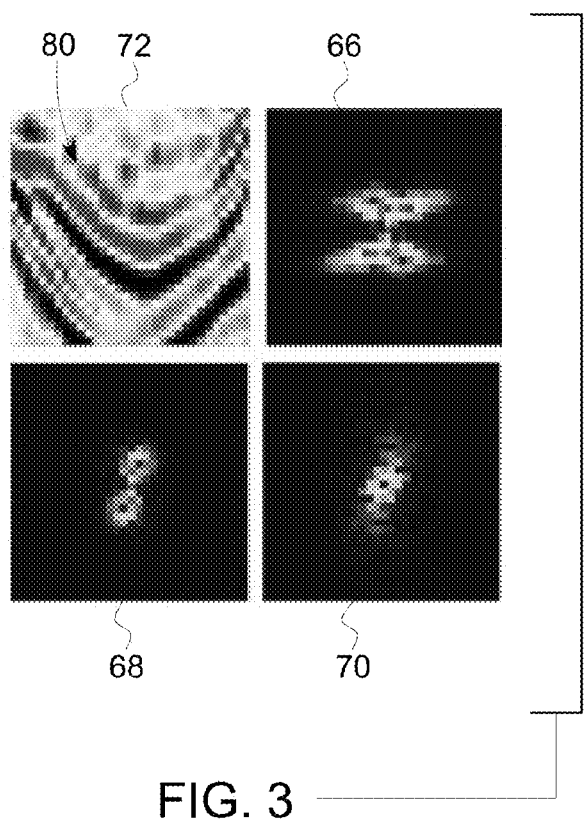
FIG. 3 depicts a view of raw seismic data and corresponding Fourier transforms at orthogonal angles, in accordance with aspect of the present disclosure.
Figure 4:
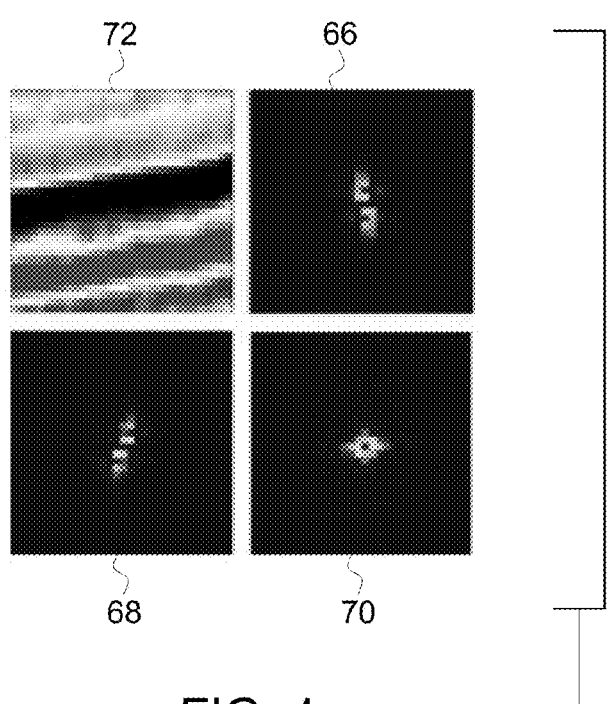
FIG. 4 depicts a further view of raw seismic data and corresponding Fourier transforms at orthogonal angles, in accordance with aspect of the present disclosure.
Figure 5:
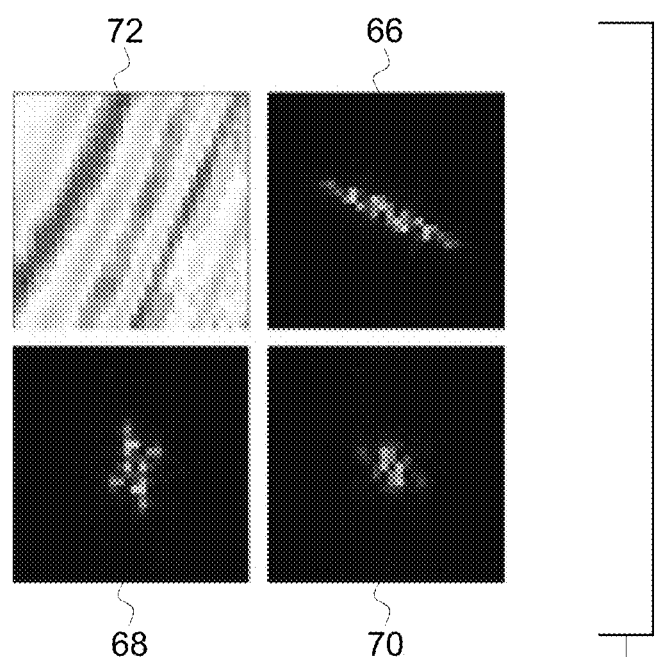
FIG. 5 depicts another view of raw seismic data and corresponding Fourier transforms at orthogonal angles, in accordance with aspect of the present disclosure.

By way of example, FIGS. 3-5 show the Fourier transform of different textures. In particular, FIGS. 3-5 depict the center slice (66, 68, 70) of 3D Fourier magnitude response in orthogonal directions obtained for corresponding raw data volumes 72. In these examples, FIG. 3 corresponds to a channel region 80, as represented by the wavy textures in the corresponding raw data 72. Fourier response for such a non-parallel structure, as depicted in corresponding orthogonal center slices 66, 68, 70 of the Fourier magnitude response, results in the spread of amplitude response in certain of the observed orthogonal directions. Conversely, FIGS. 4 and 5 depict raw seismic volume data 72, and orthogonal slices 66, 68, 70 of Fourier magnitude response, of two different simple parallel texture systems having different orientations and amplitude modulations. In these example, the Fourier magnitude response of the simple parallel texture regions result in more compact magnitude distributions. Note that orientation of the magnitude response is consistent with the surface normal of the simple parallel textures.

Figure 6:
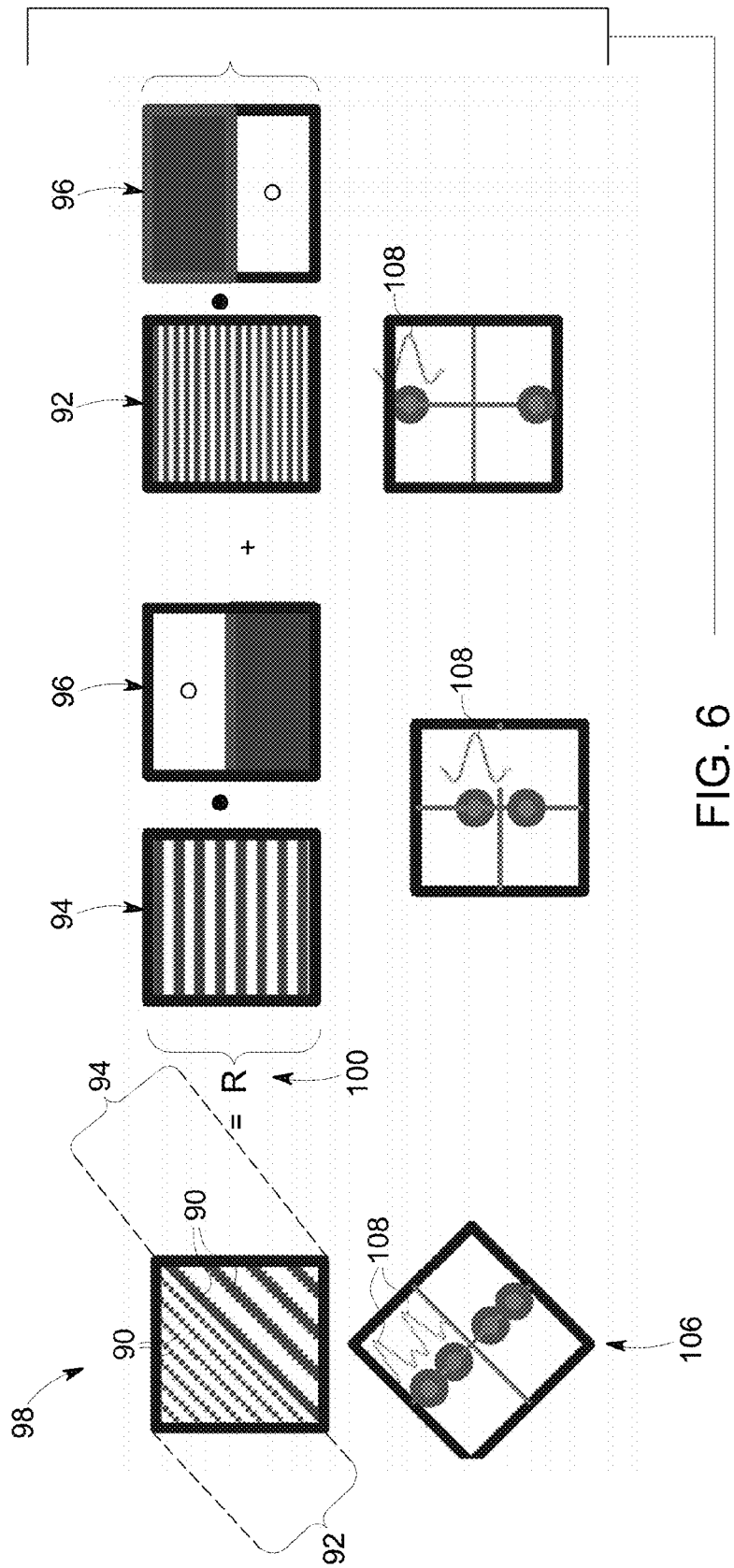
FIG. 6 depicts a schematic view of the decomposition of a rotated view having simple parallel textures at different frequencies, in accordance with aspect of the present disclosure.

It should be noted that, since modulation frequency of the textures might vary depending on the location of the strata due to various reasons, e.g. depth; intensity profiles might have multiple modulations in a local region undergoing analysis. Fourier domain analysis of such mixed modulation signals can also be used to model such local variations. For example, turning to FIG. 6, a schematic example is depicted where facies 90 are arbitrarily oriented. As will be appreciated, any given image region having multiple modulations can be written in terms of rotated joint modulations. Turning to FIG. 6, the signal 98 is the rotation of the joint modulation of the constituent components, where R 100 is the effective rotation. Two modulations are apparent in the region 98: a high frequency modulation 92 is followed by a low frequency component 94. Each modulation is effective in the region defined by their influence zone, defined by with complementary binary masks 96, though, non-binary or graded masks may also be used in other implementations. In addition, FIG. 6 also depicts a corresponding frequency analysis (i.e., the bottom row illustrations) of the modulation constituents depicted above, where the original signal 106 has multiple frequency components 108 due to the superposition of the individual modulation components 108.

With the foregoing Fourier analysis discussion in mind, let I be an image region (e.g., a 3D seismic reconstruction 62 or a portion of such a reconstruction) having multiple simple parallel textures whose orientation can be defined by a common rotation matrix R. Let also $B_i$ (i=1, 2, ..., n) be the $i^{th}$ modulation having frequency, $f_i$, effective in the region defined by the corresponding mask, $M_i$. The rotated signal 98 having mixed modulation can thus be written as:

$$I = R(\Sigma_{i=1}^{n} B_i M_i). \quad (1)$$

As discussed above, one way to analyze instances of joint modulation is to use Fourier domain analysis that represents data in terms of its modulation frequencies, where the frequency response magnitude of the joint modulation can be decomposed into the bases in terms of the individual modulation frequency (or bases). A Fourier transform (FT) of I can be written as:

$$F = \Im\{I\} = R\Sigma_{i=1}^{n} \Im\{B_i M_i\} = R\Sigma_{i=1}^{n}(\Im\{B_i\} * \Im\{M_i\}) \quad (2)$$

where $\Im\{B_i\} * \Im\{M_i\}$ is the convolution between the Fourier transforms of the $i^{th}$ basis $B_i$ with its mask $M_i$. Thus, in this example, the rotation invariance and the linearity property of the Fourier transform are used. As will be appreciated, $\Im\{M_i\}$ is a sinc function and its convolution with $\Im\{B_i\}$ is another sinc function centered around $f_i$. Consequently, the Fourier transform of I is the superposition of the replicated Fourier transforms. With this in mind, the basis behind certain implementations discussed herein is to uncover modulations in the seismic data that is consistent with simple parallel textures.

Figure 7:
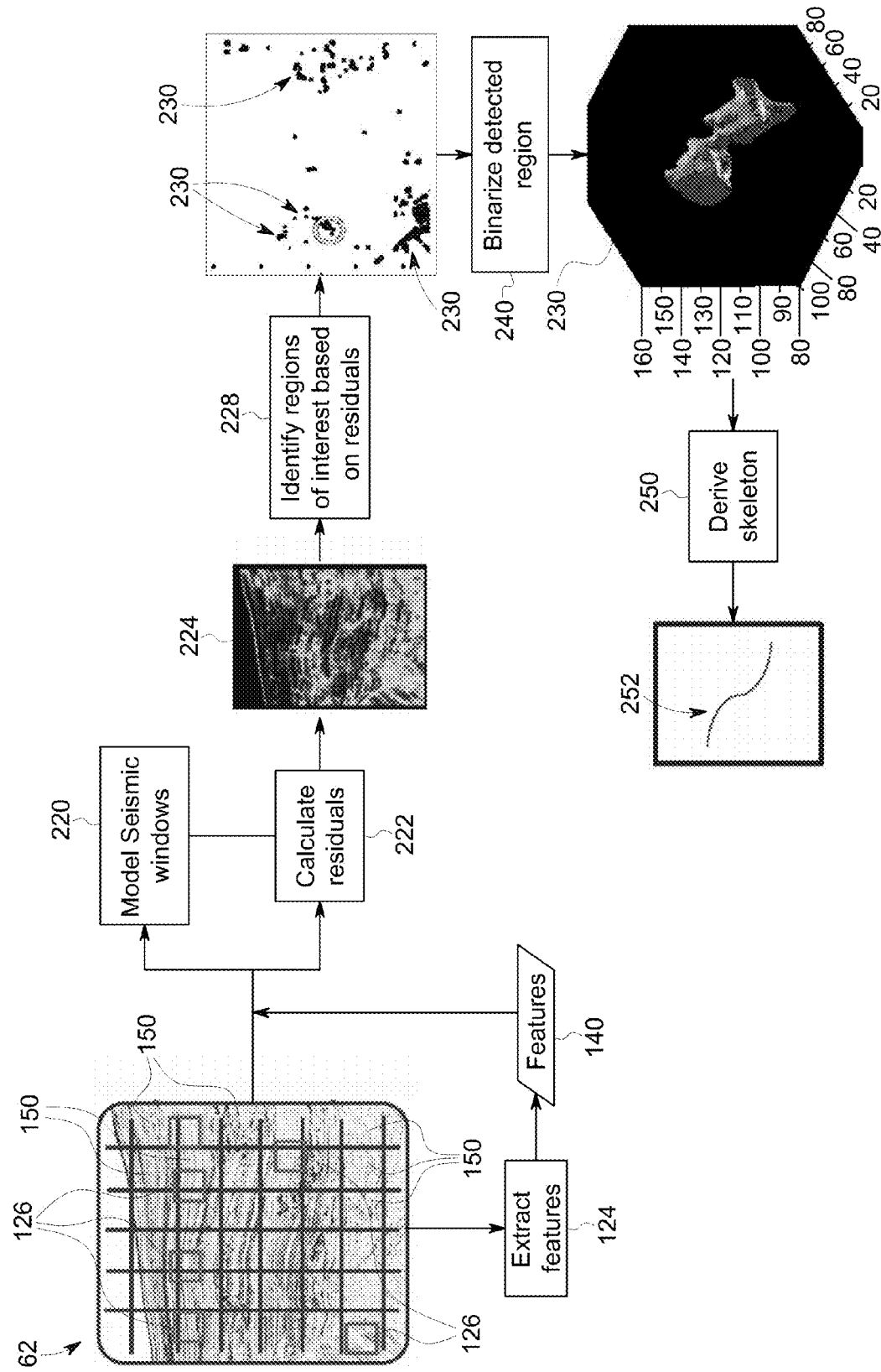
FIG. 7 depicts a process flow diagram of an implementation of an analysis of volumetric seismic data for complex structures of interest, in accordance with aspect of the present disclosure.

With the foregoing in mind, in order to represent simple parallel texture modulations, Fourier response of the simple parallel textures may be estimated in a training phase. For example, turning to FIG. 7, a process flow diagram is depicted in which an initial set of 3D seismic data 62 is provided for analysis. In this example, a large volume of seismic data is provided and uniform subsets 150 of the data 62 are defined for training purposes. In the context of FIG. 7, identification and processing of the subsets 150 is characterized by a feature extraction step (block 124). One implementation of such a feature extraction step 124 is discussed in greater detail in FIG. 8 in a corresponding flow diagram.

Figure 8:
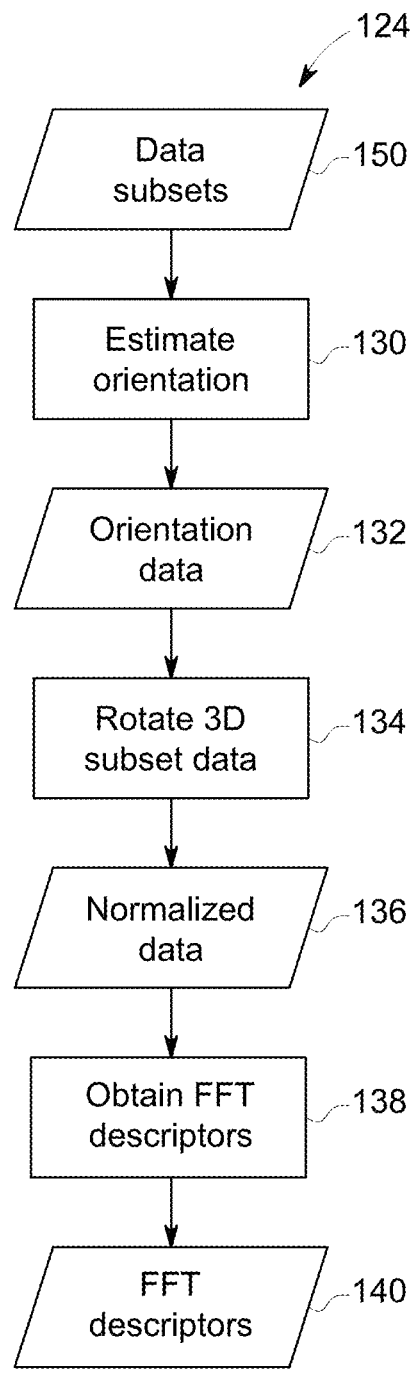
FIG. 8 depicts a process flow diagram of a seismic feature extraction routine, in accordance with aspect of the present disclosure.

Turning to FIG. 8, in one implementation, each training subset 150 is registered to a common coordinate system by calculating (block 130) the orientation 132 of each subset 150 and rotating (block 134) the respective training subset data 150 with the estimated relative angular displacement to generate normalized data sets 136. Orientation 132 of a simple parallel texture is estimated (block 130) for each training subset 150, in one embodiment, using the Fourier transform in spherical coordinate system. For example, the local maxima of the Fourier transform response that is marginalized over the radius coordinate may be calculated. Azimuth (θ) and elevation (Φ) angles are selected as the local maxima of the marginalized transformation, ρ(θ,Φ), and given as:

$$[\bar{\theta}, \bar{\Phi}] = \underset{\theta,\Phi}{\mathrm{argmax}}(\rho(\theta, \Phi)) = \underset{\theta,\Phi}{\mathrm{argmax}}\left(\int_{r=0}^{\infty} F(r, \theta, \Phi) dr\right) \quad (3)$$

In one implementation, a uniformly displaced grid for r, θ, and Φ is generated to resample the Fourier magnitudes on the polar grid and the above integral is replaced with a finite summation. Yaw and roll angles, $(\bar{\theta}, \bar{\Phi})$, are set as the global maxima of the marginalized magnitude response.

In order to register images to the common coordinate system (i.e., to generate normalized data 136), training subset data 150 is rotated using θ and Φ in three dimensions. In addition, it may also be noted that the magnitude of the Fourier response can also be rotated directly in the Fourier domain. However, to the extent that the goal is to accurately model the modulations, in order to avoid any artifacts in the frequency response due to the interpolation of frequencies, the raw images may first be rotated in the spatial domain and the Fourier response of the rotated images subsequently calculated to form the basis for the simple parallel textures. A registered image region (e.g., normalized data 136) can be written as $$I_{rot} = R^T I = R_x^T(\Phi) R_z^T(\theta) I \quad (4)$$

where $R_z^T(\theta)$ and $R_x^T(\Phi)$ are the counterclockwise rotations with respect to the z and x axes respectively (i.e., roll and yaw). Based on the normalized data 136, one or more fast Fourier transform descriptors 140 (i.e., features) may be obtained or derived (block 138) that facilitate identification of simple parallel textures in the entire data set 62. Prior to turning back to FIG. 7, it may be noted that the present orientation estimation approach can also be employed to locally flatten the volume 62 using the estimates of the local orientations throughout the volume 62.

With the foregoing explanation and discussion in mind, and turning back to the implementation described in FIG. 7, the spatially oriented fast Fourier transform (FFT) descriptors 140 derived from the feature extraction step 124 are used to model (block 220) seismic windows (e.g., data subsets) within the 3D seismic volume 62 and to thereby detect simple parallel textures within the volume 62. In certain implementations, a non-negative matrix factorization (as discussed below) may be employed in the modeling step. In other implementations different modeling approaches, such as a template basis approach, may be used in the modeling step.

With respect to the modeling of simple parallel textures, in one embodiment, once data subsets 150 of the volume 62 are aligned to a common frame, the magnitude of the Fourier response may be calculated to model simple parallel textures. As noted above, multiple modulations in a volume manifest themselves as multiple peaks in the magnitude of the Fourier response. In order to represent such variations throughout the volume 62, distributed image regions 126 may be manually selected in a training phase and their Fourier response is used as the basis for the simple parallel textures. In one embodiment, the image subsets 126 may be selected by a reviewer as corresponding to regions containing simple parallel textures.

The manually selected image subsets 126 corresponding to known simple parallel textures form a basis set:

$$H \in \mathbb{R}^{N \times n} \quad (5)$$

where each training image subset 126 is represented in lexicographical order. Here, n is the number of image subsets 126 in the training phase and N is the number of voxels in the respective image subsets 126. In one embodiment, the data is analyzed in terms of its dominant or principal modulations, as discussed below. Such an approach prevents or limits possible bias in the reconstruction of regions towards redundant components in the basis elements.

In one implementation, in order to reduce the redundancies and uncover the dominant frequency components, the training set is decomposed into its dominant components using a non-negative matrix factorization (NNMF) technique, such that any non-negative matrix H=W*M can be decomposed into its non-negative factors:

$$W \in \mathbb{R}^{N \times k} \quad (6)$$

and $$M \in \mathbb{R}^{k \times n} \quad (7)$$

where k is the number of mixing components. Here, W is the low rank basis matrix and M is the mixing matrix. In one embodiment, factorization is achieved using an alternating least squares algorithm and results in the factors that have minimum mean squared residual between the reconstruction and the data.

Figure 9:
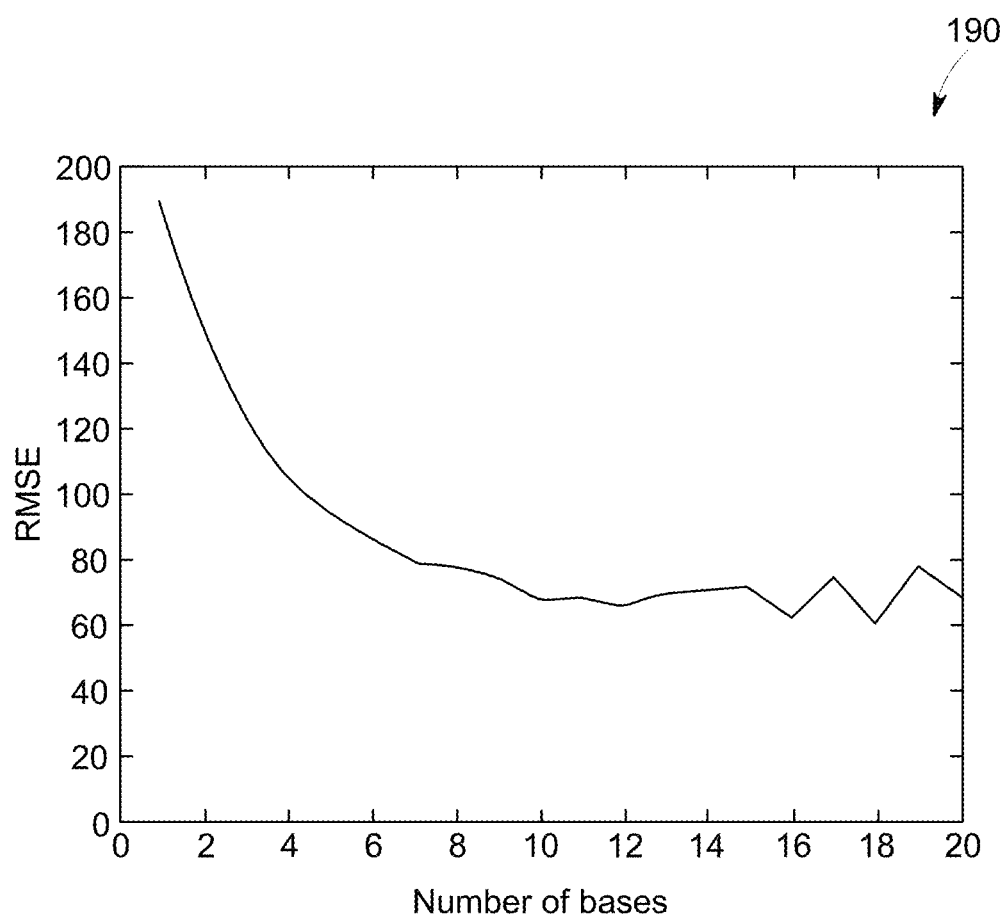
FIG. 9 depicts a graph depicting root mean square error plotted against the number of bases used in an analysis, in accordance with aspect of the present disclosure.
Figure 10:
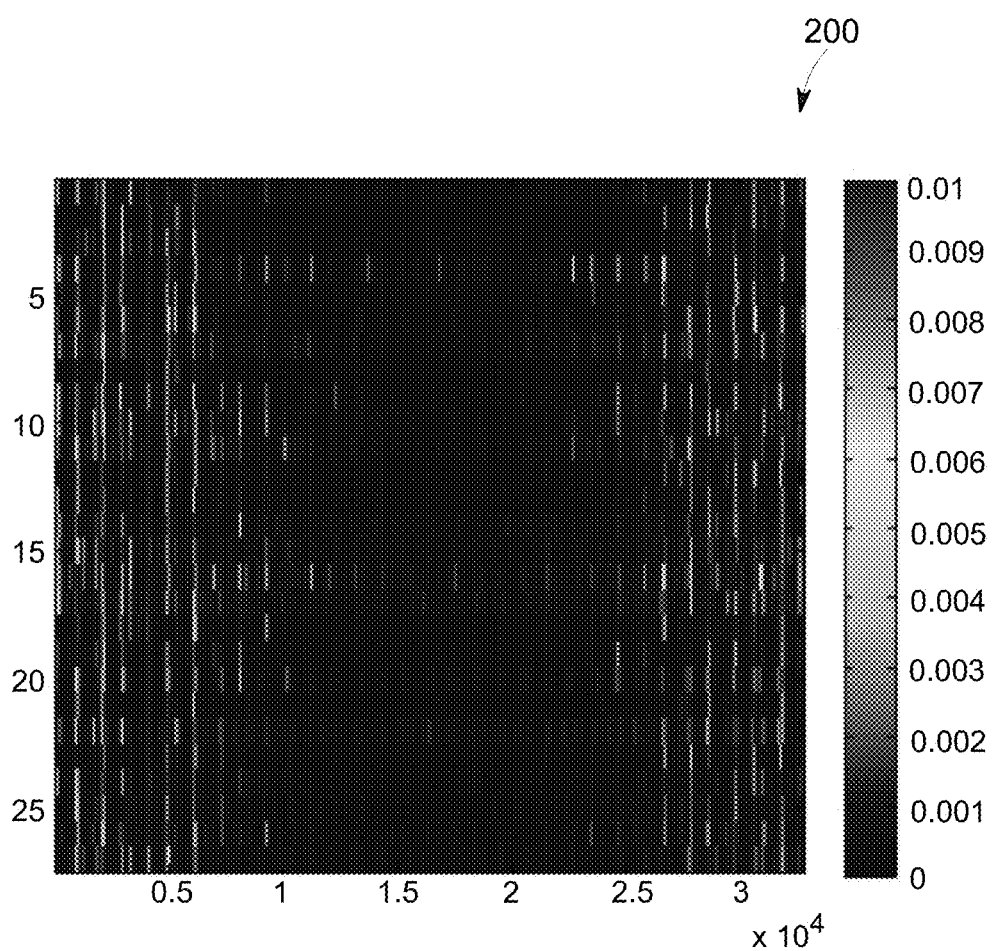
FIG. 10 depicts a basis matrix H, in accordance with aspect of the present disclosure.
Figure 11:
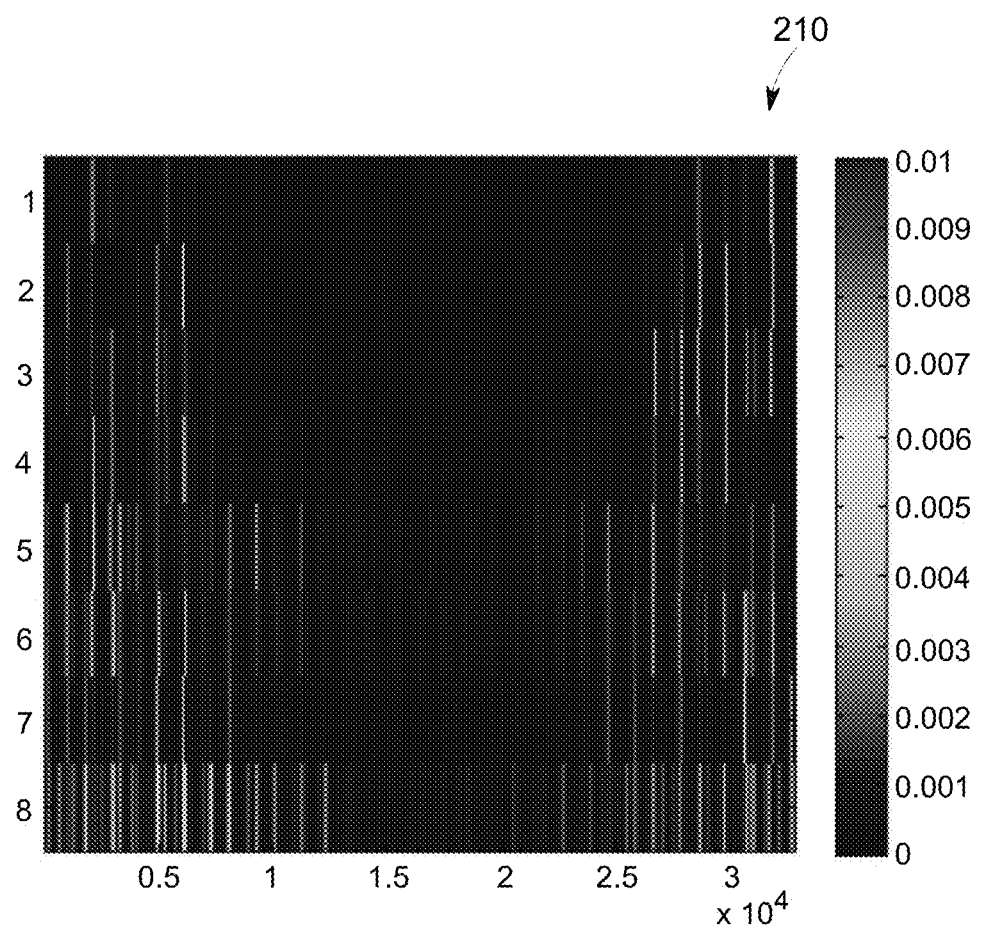
FIG. 11 depicts a basis matrix W, in accordance with aspect of the present disclosure.

Selection of k affects system performance and may be evaluated in the context of the data for reliable modeling. In one analysis, a set of k values on a training set was evaluated and the root mean squared error between the reconstruction and the data was reported. The result 190 is depicted in FIG. 9, where the root mean square error is plotted against the number of bases employed in the analysis. As depicted in FIG. 9, an increase in the number of bases results in a decrease in the residual error and, consequently, better modeling of simple parallel textures. Further, as the number of bases increase, residual error decreases, though this may be at the expense of computational time. For experimental results discussed herein, a k value of 8 was typically employed Examples of basis matrices can be seen in FIGS. 10 and 11 where FIG. 10 depicts a non-negative matrix, i.e., basis matrix H 200, and FIG. 11 depicts its low-rank approximation W 210. In particular, FIG. 10 depicts the transpose of basis vectors $H^T$ obtained from a training set where n=27 and N=32×32×32, where each row of $H^T$ corresponds to the Fourier magnitude response of a manually selected training image subset 126. As will be appreciated, this basis may be directly used to reconstruct a given test sample to determine whether the sample is a simple parallel texture or not. FIG. 11 depicts the dominant frequency components ($W^T$) as selected using the NNMF algorithm. In one experimental embodiment, the maximum number of basis was set to 8 for the purpose of experimental evaluation.

With the foregoing discussion of modeling of seismic windows (block 220) in mind, and turning back to FIG. 7, residual analysis (block 222) is performed on the 3D seismic volume 62 based upon the simple parallel texture modeling results. As discussed above, the residual analysis may be performed in order to highlight anomalies in the seismic volume 62. In one embodiment, the residual 224 of the full seismic volume 62 is calculated using the estimated simple parallel texture basis, H, and the corresponding low rank approximation, W. Columns of the both basis matrices, H and W and a data subset may be normalized to unity during the training phase in such an embodiment. Residuals with respect to H and W are calculated as discussed below.

For example, in one embodiment, Let $h_i$ be the ith column of H: i=1 . . . n and w be the Fourier magnitude of the rotated test data set or subset. The error in the reconstruction of the feature vector, w, of a test patch $I_{test}$ may be defined based on the minimum mean square error between $h_i$ and w. Thus:

$$res_{H, I_{test}} = \|w - h_j\|, \text{ where } j = \min_i \|w - h_i\| \tag{8}$$

Reconstruction with respect to basis W may be calculated using a non-negative least squares algorithm, similar to above, and the resultant error after the reconstruction is assigned as the residual 224.

In the depicted implementation of FIG. 7, the residual 224 may be further analyzed to identify regions of interest 230. For example, in one embodiment the residual volume 224 may be analyzed (block 228) using a threshold such that intensity or voxel values above the threshold are characterized as corresponding to regions of interest 130. In different embodiments, the threshold may be fixed for the volume undergoing evaluation or may vary, such as based on depth or data completeness. As will be appreciated, other factors such as proximity to or continuity with other voxels identified as being of interest may be factored in to the identification of a voxel or region as being of interest.

In the depicted implementation of FIG. 7, one or more of the detected regions of interest 230 may be binarized (block 240) (i.e., voxels identified as being in the region 230 have their intensity values set to 1 while voxels not determined to be part of the region 230 have their intensity values set to 0) or otherwise enhanced for viewing. For example, after binarization, a respective region of interest 230 (e.g., a geobody of interest) may be viewed as a volumetric reconstruction such that the shape and/or other properties of the respective region of interest 230 may be studied or examined. In the depicted example, an additional step may be taken to derive (block 250) a skeleton 252 or skeletal framework corresponding to the binarized region of interest 230, where the skeleton 252 may correspond to a centerline or other framework construction of the filtered volume that may be used in the analysis or evaluation of the respective region of interest 230.

An implementation of the above approach was tested to find channel configurations in a 3D seismic volume having 751×1001×1375 voxels. In order to calculate Fourier descriptors, image data subsets measuring 32×32×32 voxels were employed for both training and testing phases. In the training phase 27 image data subsets were uniformly selected from the data to model simple parallel textures. The final basis number was set to k=8 and residuals were calculated based on the reconstruction error outlined above.

In the testing phase, overlapping blocks were used to reduce the computational burden. For example, in the test implementation consecutive blocks were 75% overlapped in all directions resulting in a residual volume having size of 85×117×165 voxels. In order to upscale back the residual volume to raw data volume, cubic spline interpolation was employed. In order to extract geobodies in the volume, a threshold was applied to the residual volumes and connected component analysis was employed. Obtained components were filtered based on their volume and those components determined to be too large or too small components were discarded.

Figure 12:
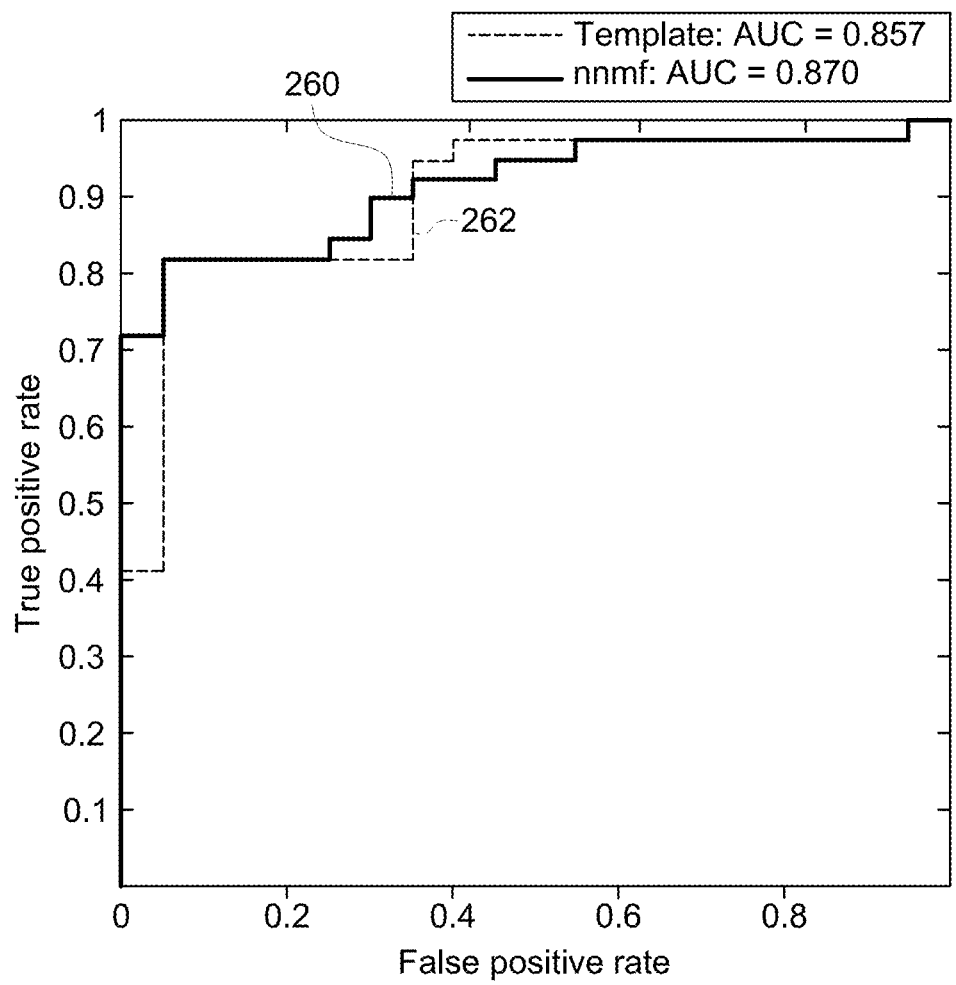
FIG. 12 depicts a plot of two ROC curves for use in threshold analysis, in accordance with aspect of the present disclosure.
Figure 13:
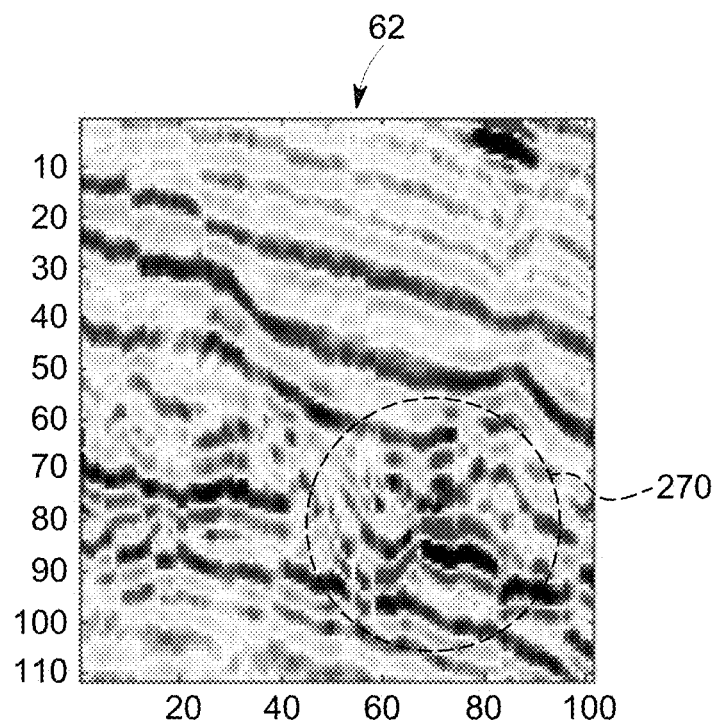
FIG. 13 depicts raw seismic data having both simple parallel textures as well as complex structures.

Turning to FIG. 12, an example of two receiver operating characteristic (ROC) curves 260, 262 are depicted that may be suitable for a threshold selection process to discriminate channels (or other geobodies of interest) from simple parallel textures. Such ROC curves may be generated as part of a validation process after receipt of expert feedback, and, thus, after establishing the true positives and true negatives with respect to the training data. By implication, therefore, the false positive and false negative rates are also established for the training data and the ROC curve provides a basis for evaluating how changing the threshold with respect to the algorithm will have on the false negative and false positive rates. In this manner, an ROC curve may be generated after receipt of user feedback regarding a test data set to evaluate the performance of the algorithm at a given threshold. Knowing the true positives and true negatives from the expert feedback, the algorithm may be run at different thresholds to determine the false positive and false negative rates associated with those thresholds. In this manner, a range of reasonable or acceptable thresholds may be determined, based on the specificity and sensitivity desired.

Turning back to the figures, in the depicted example, curve 262 corresponds to a template based approach to modeling simple parallel textures while curve 260 corresponds to an NNMF-based approach, as discussed above. In such an implementation, a voxel residual value above the respective threshold value of the respective curve being employed results in the voxel being classified as being of interest or as being part of a region of interest. As noted above, other factors, such as neighborhood conditions, may also be considered in the classification of voxels as being of interest. In one experiment, 30 channels and 40 simple parallel textures were manually selected. By varying the threshold value, the (sensitivity) versus (1-specifity) variations were recorded and the threshold for the residuals were selected as the operating point that results in a greater than 85% hit rate.

Figure 14:
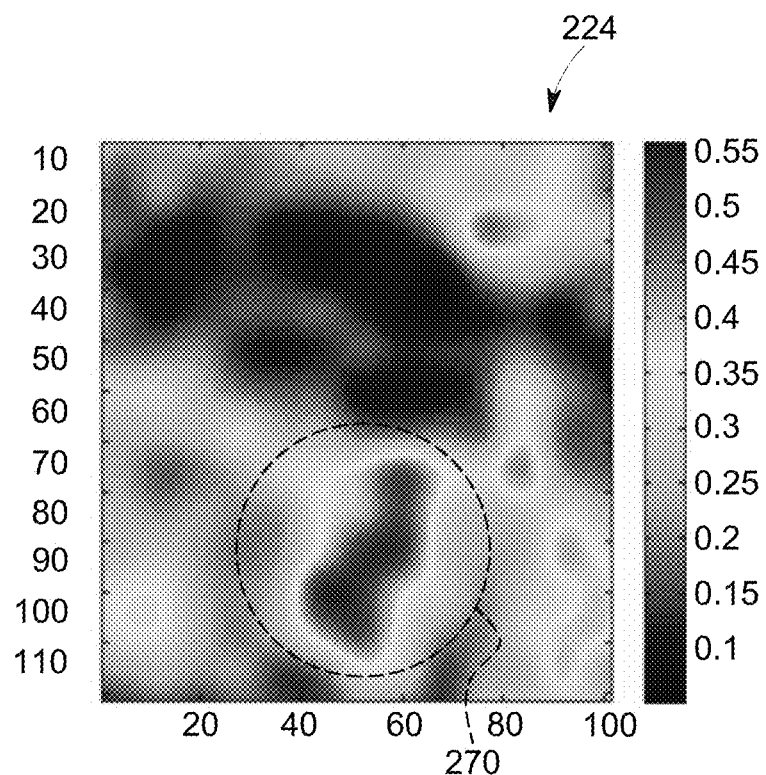
FIG. 14 depicts a residual image derived based on modeling simple parallel textures of FIG. 13, in accordance with aspect of the present disclosure.

By way of further example, FIGS. 13-16 depict a sequence of representations corresponding to different steps of the present approach. In this sequence of representations, FIG. 13 corresponds to a 3D volume 62 of seismic data to undergo analysis. In the depicted example, the volume 62 includes regions of simple parallel textures as well as a geobody of interest, e.g., a channel system, indicated by dashed circle 270. In FIG. 14, a residual image 224 is depicted which has been generated in accordance with the approach discussed above where simple parallel textures are initially modeled and used in the determination of residual or outlier regions corresponding to more complex structures. In the depicted example, the residual is obtained using NNMF basis. In this figure, the dashed circle 270 corresponds to the channel system of FIG. 13 and shows up as a hot spot within the image.

Figure 15:
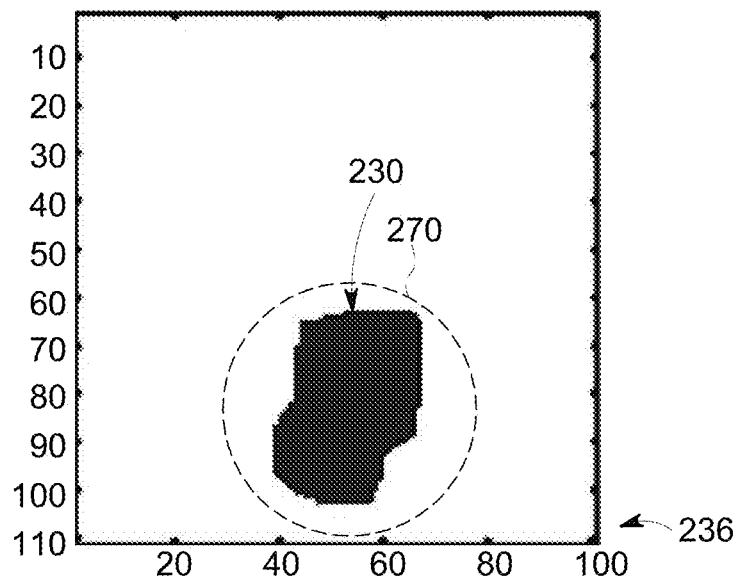
FIG. 15 depicts regions of interest derived by threshold processing the residual image of FIG. 14.

Turning to FIG. 15, the values of residual image 224 are thresholded, such as using a suitable ROC curve, to generate a thresholded image 236. In the depicted example, the threshold is selected to yield an 85% hit rate. In addition, a volume filter may be applied such that the resulting thresholded volumes that are above and/or below a set criterion are discarded. As will be appreciated, the dashed circle 270 continues to correspond to the channel system of FIGS. 13-15.

Figure 16:
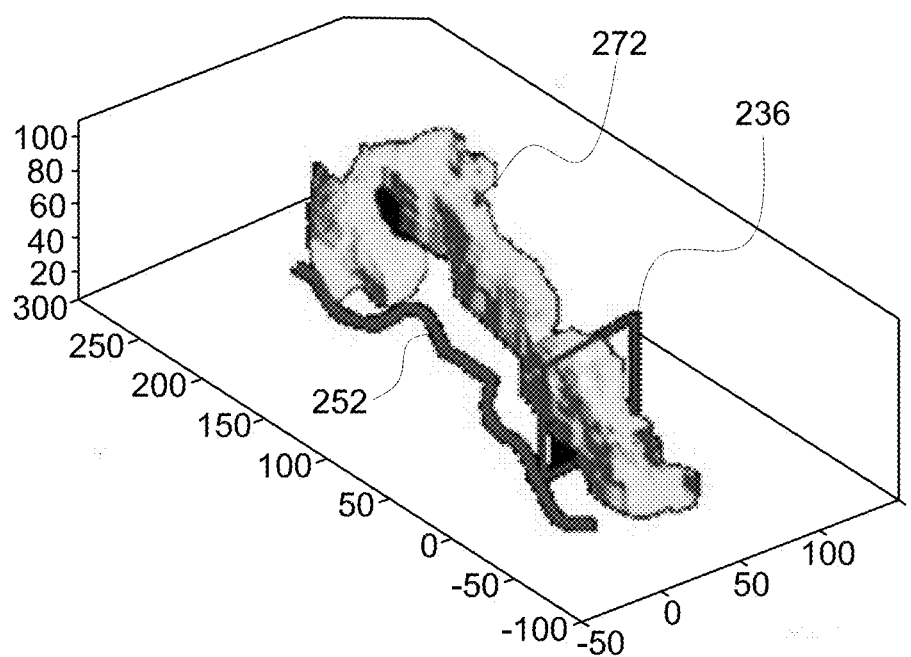
FIG. 16 depicts a 3D isosurface corresponding to a detected volume of interest identified within the seismic volume of FIG. 13, in accordance with aspect of the present disclosure.

While the preceding views depict sectional or slice views of the respective 3D volumetric data for convenience, FIG. 16 depicts a 3D isosurface 272 of the detected volume of interest 230, e.g., a channel system. In this depicted example, the rectangle 236 corresponds to the 2D sectional view presented in FIG. 15. In addition, the 3D isosurface 272 in FIG. 16 is presented in conjunction with a skeleton 252 derived from the filtered volume. Such skeletons 252 correspond, in certain embodiments, to the extracted centerlines of the detected regions.

With the foregoing discussion in mind, the present approach initially involves the estimation of the orientation of local regions within a 3D seismic volume. Based on the estimated orientations the volume is locally flattened to align the local region (e.g., data subsets) into a common reference system (time axis). In a training phase, Fourier descriptors are used to extract low level features to model the parallel textures. The same descriptors may be used to construct test images using the obtained simple parallel texture model in the reconstruction phase. In one implementation, it is assumed that simple parallel textures are amplitude modulated cosine functions. Variations in the frequency response of such regions are successfully recovered, such as using non-negative matrix factorization techniques. The present approach may be used for automatic anomaly detection, such as in large seismic data volumes, where outliers (such as channels, pinchouts, gas chimneys, and so forth) result in high residual responses.

Technical effects of the invention include automatic analysis or evaluation of a seismic data set based on initial modeling of simple parallel textures within the seismic data. Based on the modeling of the simple parallel textures, outlier regions may be identified based on residual analysis. Such outliers correspond to geobodies or other structures that are more complex than simple parallel textures and that may be of interest to a reviewer as being a geobody of interest, such as a channel, pinchout, or gas chimney.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented method for analyzing seismic data, comprising the acts of:
   accessing a volumetric seismic data set for analysis by a processor of a processor-based system programmed to analyze seismic data;
   using the processor, applying a Fourier transform to a plurality of regions of the volumetric seismic data set, wherein the Fourier transform represents data in terms of its modulation frequencies and wherein those modulation frequencies meeting one or more threshold criteria correspond to simple parallel textures within the volumetric seismic data set;
   using the processor, identifying one or more residual regions within the volumetric seismic data set based on those modulation frequencies not meeting one or more threshold criteria; and
   displaying the one or more residual regions or a graphic derived from the one or more residual regions for review, wherein the one or more residual regions or the graphic highlight anomalies that are distinguishable from parallel textures in the volumetric seismic data and correspond to geobodies associated with hydrocarbon extraction.

2. The method of claim 1, wherein modeling the plurality of parallel regions comprises performing a training operation based on a plurality of training subsets within the volumetric seismic data set.

3. The method of claim 2, wherein the training operation comprises:
   estimating an orientation of parallel surfaces within each training subset;
   normalizing each training subset by rotating the training subset data based on the estimated orientation; and
   deriving one or more descriptors for each normalized training subset.

4. The method of claim 3, wherein the one or more descriptors comprise fast Fourier transform descriptors.

5. The method of claim 2, wherein the plurality of training subsets are uniformly or non-uniformly spaced within the volumetric seismic data set.

6. The method of claim 2, wherein the training operation is based on a plurality of manually selected training subsets of the volumetric seismic data set.

7. The method of claim 6, wherein the plurality of manually selected training subsets are selected based upon a user determination that each training subset contains parallel regions.

8. The method of claim 1, wherein identifying one or more residual regions within the volumetric data set comprises employing a non-negative matrix factorization.

9. The method of claim 1, wherein identifying one or more residual regions within the volumetric data set comprises employing a template based analysis.

10. The method of claim 1, wherein the one or more threshold criteria are evaluated or validated based on a receiver operating characteristic curve after interpretation of known test data.

11. The method of claim 1, comprising generating a volumetric representation of at least one of the thresholded residual regions.

12. The method of claim 11, wherein the volumetric representation comprises a three-dimensional isosurface.

13. The method of claim 11, comprising deriving a centerline for the volumetric representation.

14. The method of claim 1, wherein modeling the plurality of parallel regions comprises employing one of a non-negative matrix factorization or a template based approach.

15. The method of claim 1, wherein identifying one or more residual regions comprises identifying one or more residual regions having modeling errors above a threshold criterion.

16. The method of claim 13, wherein the threshold criterion is fixed for the volumetric seismic data set or varies by depth.

17. A non-transitory, computer-readable medium configured to store one or more routines executable by a processing system programmed to analyze seismic data, the routines, when executed by a processor of the processing system, causing acts to be performed comprising:
   accessing a volumetric seismic data set for analysis by the processor of the processing system;

using the processor, modeling a plurality of parallel regions within the volumetric seismic data set using a Fourier transform of portions of the volumetric seismic data set, wherein the Fourier transform represents data in terms of its modulation frequencies and wherein those modulation frequencies meeting one or more threshold criteria correspond to simple parallel textures within the volumetric seismic data set;

using the processor, identifying one or more residual regions within the volumetric seismic data set based on those modulation frequencies not meeting one or more threshold criteria; and displaying the one or more residual regions or a graphic derived from the one or more residual regions for review, wherein the one or more residual regions or the graphic highlight anomalies that are distinguishable from parallel textures in the volumetric seismic data and correspond to geobodies associated with hydrocarbon extraction.

18. The non-transitory, computer-readable medium of claim 17, wherein modeling the plurality of parallel regions comprises performing a training operation based on a plurality of training subsets within the volumetric seismic data set.

19. The non-transitory, computer-readable medium of claim 18, wherein the one or more routines further comprise routines, which, when executed causes acts to be performed comprising:
   estimating an orientation of parallel surfaces within each training subset;
   normalizing each training subset by rotating the training subset data based on the estimated orientation; and
   deriving one or more descriptors for each normalized training subset.

20. The non-transitory, computer-readable medium of claim 18, wherein modeling the plurality of parallel regions comprises performing a testing operation is based on a plurality of manually selected testing subsets of the volumetric seismic data set.

21. The non-transitory, computer-readable medium of claim 17, wherein the one or more routines further comprise a routine, which, when executed causes an act to be performed comprising processing the one or more residual regions to generate a thresholded residual image.

22. The non-transitory, computer-readable medium of claim 21, wherein the one or more routines further comprise a routine, which, when executed causes an act to be performed comprising generating a volumetric representation of at least one of the thresholded residual regions.

23. The non-transitory, computer-readable medium of claim 22, wherein the one or more routines further comprise a routine, which, when executed causes an act to be performed comprising deriving a centerline for the volumetric representation.

24. A seismic data analysis system, comprising:
   a memory storing one or more routines; and
   a processing component configured to execute the one or more routines stored in the memory, wherein the one or more routines, when executed by the processing component, cause acts to be performed comprising:
      accessing a volumetric seismic data set for analysis;
      modeling a plurality of parallel regions within the volumetric seismic data set using a Fourier transform of portions of the volumetric seismic data set, wherein the Fourier transform represents data in terms of its modulation frequencies and wherein those modulation frequencies meeting one or more threshold criteria correspond to simple parallel textures within the volumetric seismic data set;
      identifying one or more residual regions within the volumetric seismic data set based on those modulation frequencies not meeting one or more threshold criteria; and
      displaying the one or more residual regions or a graphic derived from the one or more residual regions for review, wherein the one or more residual regions or the graphic highlight anomalies that are distinguishable from parallel textures in the volumetric seismic data and correspond to geobodies associated with hydrocarbon extraction.

25. The seismic data analysis system of claim 24, wherein modeling the plurality of parallel regions comprises performing a training operation based on a plurality of training subsets within the volumetric seismic data set.

26. The seismic data analysis system of claim 25, wherein the one or more routines further comprise routines, which, when executed causes acts to be performed comprising:
   estimating an orientation of parallel surfaces within each training subset;
   normalizing each training subset by rotating the training subset data based on the estimated orientation; and
   deriving one or more descriptors for each normalized training subset.

27. The seismic data analysis system of claim 24, wherein the one or more routines further comprise a routine, which, when executed causes an act to be performed comprising processing the one or more residual regions to generate a thresholded residual image.

28. The seismic data analysis system of claim 27, wherein the one or more routines further comprise a routine, which, when executed causes an act to be performed comprising generating a volumetric representation of at least one of the thresholded residual regions.

29. The non-transitory, computer-readable medium of claim 17, wherein identifying the one or more residual regions comprises calculating a residual of the seismic data set using an estimated simple parallel texture basis and a corresponding low rank approximation of the estimated simple parallel texture basis.

* * * * *